(12) United States Patent  (10) Patent No.: US 8,854,530 B2
Nakamoto  (45) Date of Patent: Oct. 7, 2014

(54) DISPLAY APPARATUS OF IMAGE PICKUP APPARATUS WITH FUNCTION TO CORRECT PHASE DIFFERENCE AF

(75) Inventor: Miyako Nakamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 13/423,970

(22) Filed: Mar. 19, 2012

(65) Prior Publication Data

US 2012/0242890 A1  Sep. 27, 2012

(30) Foreign Application Priority Data

Mar. 24, 2011  (JP) .................................. 2011-065102

(51) Int. Cl.
H04N 5/222 (2006.01)
H04N 5/232 (2006.01)
G03B 17/20 (2006.01)
G03B 13/36 (2006.01)

(52) U.S. Cl.
CPC ............ *H04N 5/23293* (2013.01); *G03B 17/20* (2013.01); *G03B 13/36* (2013.01); *H04N 5/23212* (2013.01)
USPC ........................ 348/346; 348/345; 348/333.01

(58) Field of Classification Search
USPC .......... 348/207.99, 333.01, 346, 345; 396/91, 396/137
See application file for complete search history.

(56) References Cited

U.S. PATENT DOCUMENTS

| 2004/0165879 A1* | 8/2004 | Sasaki et al. | 396/137 |
| 2008/0199168 A1* | 8/2008 | Sakaguchi | 396/91 |
| 2009/0047010 A1* | 2/2009 | Yoshida et al. | 396/127 |

FOREIGN PATENT DOCUMENTS

| JP | 2000-292684 | 10/2000 |
| JP | 2001-174690 | 6/2001 |
| JP | 2008-203454 | 9/2008 |

* cited by examiner

*Primary Examiner* — Joel Fosselman

(74) *Attorney, Agent, or Firm* — Cowan, Liebowitz & Latman, P.C.

(57) ABSTRACT

The present invention is intended to display information of a focal length to be corrected or a focus position of a lens on a screen so that the user easily set a proper correction value even when the correction value of the in-focus position of the phase difference AF is different depending on the focal length or the focus position. A display apparatus of an image-pickup apparatus includes a lens information display 510, 531 configured to display lens information including at least one of information relating to a focal length of a lens unit and information relating to a focus position, a scale 503 that represents a correction value for correcting an in-focus position of a phase difference AF, and an indicator 520*a-c*, 530*a-c* that is used for setting the correction value corresponding to at least one of the focal length and the focus position.

11 Claims, 16 Drawing Sheets

DISPLAY APPARATUS OF IMAGE PICKUP APPARATUS WITH FUNCTION TO CORRECT PHASE DIFFERENCE AF

BACKGROUND OF THE INVENTION

1. Field of the Invention

The present invention relates to a display apparatus, and in particular relates to a display apparatus of an image pickup apparatus that has a function to correct a phase difference AF.

2. Description of the Related Art

Conventionally, in a single lens reflex camera that is focused with a phase difference AF, an in-focus position changes due to the duration of each lens and camera main body with its use, and the focusing accuracy may fall compared to when purchased.

With regard to the lens, there may be the case that while it was planned to drive the lens to a present in-focus position, a stop position of the lens shifts by a backlash due to its duration. With regard to the camera main body, there may be the case that the angle of a mirror changes with the drive of the mirror, a way where light enters an AF sensor changes, and a position depart from the present in-focus position is regarded as the in-focus position.

In these cases, the user must take the camera to a service center and request readjustment of the in-focus position in order to return the in-focus position to former state.

To solve the above problems, for example Japanese Patent Laid-Open No. 2001-174690 discloses a function to correct the in-focus position in the phase difference AF.

Japanese Patent Laid-Open No. 2008-203454 discloses a display method of a function to correct the in-focus position in the phase difference AF.

Japanese Patent Laid-Open No. 2000-292684 discloses a function to automatically correct the in-focus position of the phase difference AF by using the contrast detection method. This correction value can be set in each focal length.

Japanese Patent Laid-Open No. 2001-174690, however, can set only one correction value for one lens.

Japanese Patent Laid-Open No. 2008-203454 provides only display for setting one correction value for one lens.

Japanese Patent Laid-Open No. 2000-292684 does not teach a concrete method for acquiring the correction value depending on the focal length of a zoom lens.

In some lenses, the value to be corrected is different depending on the focal length or the focusing position. Therefore, when the user wants to correct the in-focus position of the phase difference AF according to the focal length or the focus position, the correction value could not be plainly displayed.

SUMMARY OF THE INVENTION

The present invention is intended to display information of a focal length to be corrected or a focus position of a lens on a screen so that the user easily set a proper correction value even when the correction value of the in-focus position of the phase difference AF is different depending on the focal length or the focus position.

A display apparatus of an image-pickup apparatus as one aspect of the present invention includes a lens information display configured to display lens information including at least one of information relating to a focal length of a lens unit and information relating to a focus position, a scale that represents a correction value for correcting an in-focus position of a phase difference AF, and an indicator that is used for setting the correction value corresponding to at least one of the focal length and the focus position.

Further features and aspects of the present invention will become apparent from the following description of exemplary embodiments with reference to the attached drawings.

DESCRIPTION OF THE PREFERRED EMBODIMENTS

Hereinafter, preferred embodiments of the present invention will be described with reference to the drawings.

First Embodiment

A digital single lens reflex camera system (an optical apparatus) capable of exchanging lenses will be described as a first embodiment of the present invention.

Figure 1:
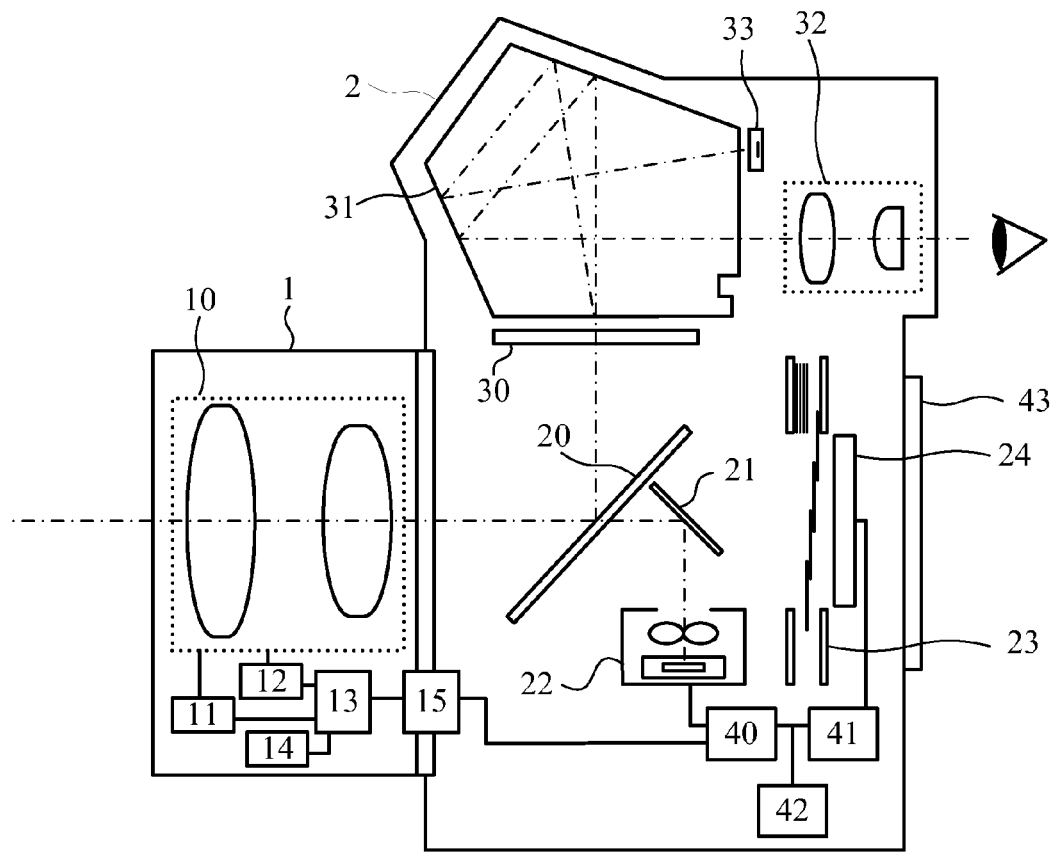
FIG. 1 is a schematic cross-sectional view of a camera in taking down a mirror.
Figure 2:
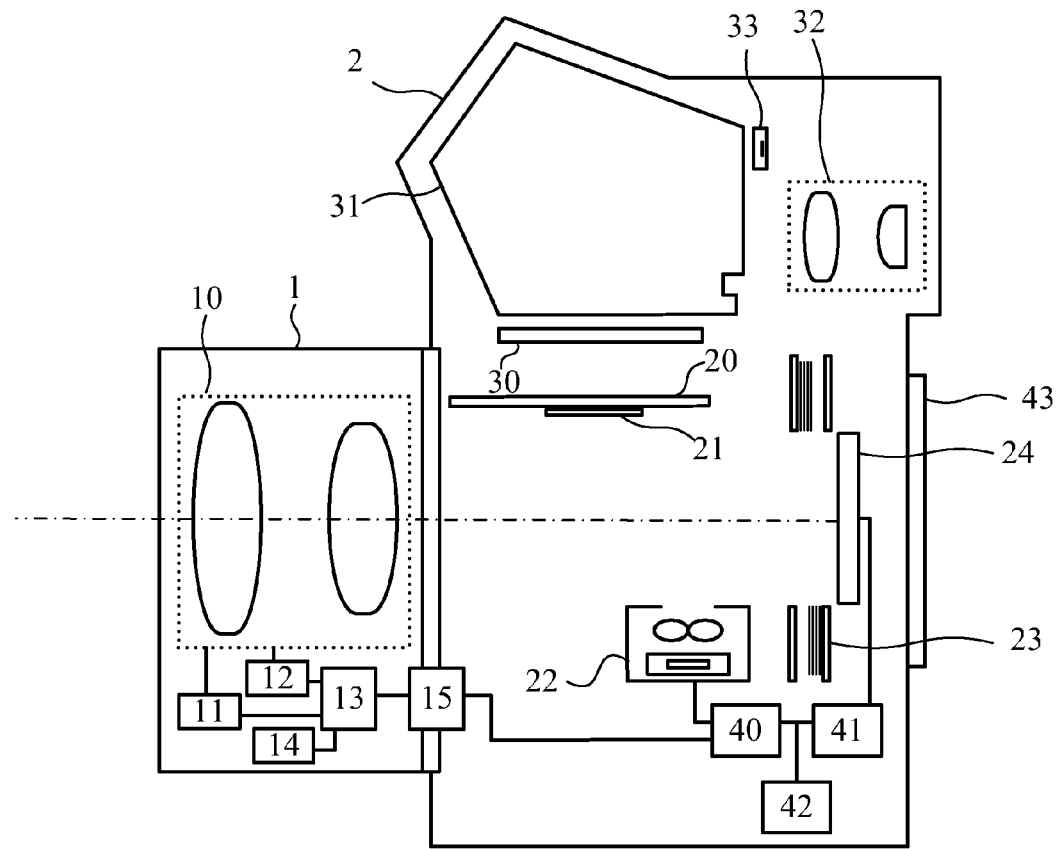
FIG. 2 is a schematic cross-sectional view of the camera in taking up the mirror.

FIGS. 1 and 2 are schematic cross-sectional views of a camera in the first embodiment.

An image-pickup optical system 10 contained in a lens main body (lens unit) 1 includes one or more lens units, and is capable of changing a focal length and a focus position by driving a part or all of the lens units.

A lens driver 11 is configured to drive a part or all of lenses included in the image-pickup optical system 10 and to adjust a focus state.

A lens state detector 12 is configured to detect the focal length of the image-pickup optical system 10, that is to say, a zoom position and the focus position.

Moreover, a lens controller 13 is configured to govern a control of the whole of a lens main body 1 including a lens memory 14 configured by a ROM or the like.

A contact point 15 is equipped on the lens main body 1 and a camera main body (image-pickup apparatus) 2, and when they are attached to each other, a communication of various information or a power supply is conducted via the contact point 15.

A main mirror 20 is configured by a half mirror that is rotatable in accordance with an operation state of the camera, and it is obliquely provided in an image-pickup optical path in observing an object through a finder so as to bend a light flux from the lens main body 1 to introduce it to an after-mentioned finder optical system (see FIG. 1). Further, the main mirror 20 is retracted from the image-pickup optical path in taking an image or in performing a live view display to introduce the light flux from the lens main body 1 to the image-pickup element 24 described below (see FIG. 2).

A sub-mirror 21 is configured to rotate along with the main mirror 20, and bends a light flux transmitting the main mirror 20 to introduce it to an after-mentioned AF sensor 22 when the main mirror 20 is obliquely provided in the image-pickup optical path (see FIG. 1). Further, in taking the image or in performing the live view display, the sub-mirror 21 is retracted from the image-pickup optical path by rotating along with the main mirror 20 (see FIG. 2).

The AF sensor 22 is constituted of an area sensor that is configured by a secondary imaging lens and a plurality of CCDs or CMOSs, or the like, and it enables a focus detection using the phase difference method that is well-known.

A shutter 23 is used for controlling the incidence of the light flux from the lens main body 1 to an after-mentioned image-pickup element 24, and it is closed under normal conditions (see FIG. 1) and is opened in taking the image or in performing the live view display (see FIG. 2).

The image pickup element 24 is configured by a CMOS image sensor and its peripheral circuitry.

A focus plate 30 is arranged on a primary imaging surface of the lens main body 1, includes a Fresnel lens (condensing lens) on an incident surface of the focus plate 30, and forms an object image (finder image) on an exit surface. A pentaprism 31 is used for changing a finder optical path, and corrects to a normal upright image the object image formed on the exit surface of the focus plate 30.

An eyepiece lens 32 is configured so as to adjust a visibility according to user's eye when the user looks into the finder.

An optical system configured by the focus plate 30, the pentaprism 31 and the eyepiece lens 32 is referred to as a finder optical system.

An AE sensor 33 is configured by a photodiode corresponding to each area divided in the image-pickup area, and measures the luminance of the object image formed on the exit surface of the focus plate 30.

A mechanism controller 40 is a microcomputer (central processing unit; MPU) that controls a camera part and the whole camera.

A digital controller 41 is a memory controller (ICU) that performs various controls of the image data. The digital controller 41 can be used as a focus detector in the contrast method, which detects a contrast of an image taken by the image-pickup element and determines the in-focus position.

A camera memory 42 stores a setting for performing various controls, adjustment data, etc.

A liquid crystal monitor 43 is a display apparatus that displays the taken image or various information of the taken image.

In addition, FIGS. 1 and 2 do not illustrate a SET button and a cancel button, which are installed in the camera main body 2. When the SET button is displayed on the liquid crystal monitor 43, the operation of decision, selection, or the likes is enabled by hitting this SET button. Further, when the cancel button is displayed on the liquid crystal monitor 43, the operation of returning to the previous state, ending a specific mode, or the likes is enabled by hitting the cancel button.

Figure 3:
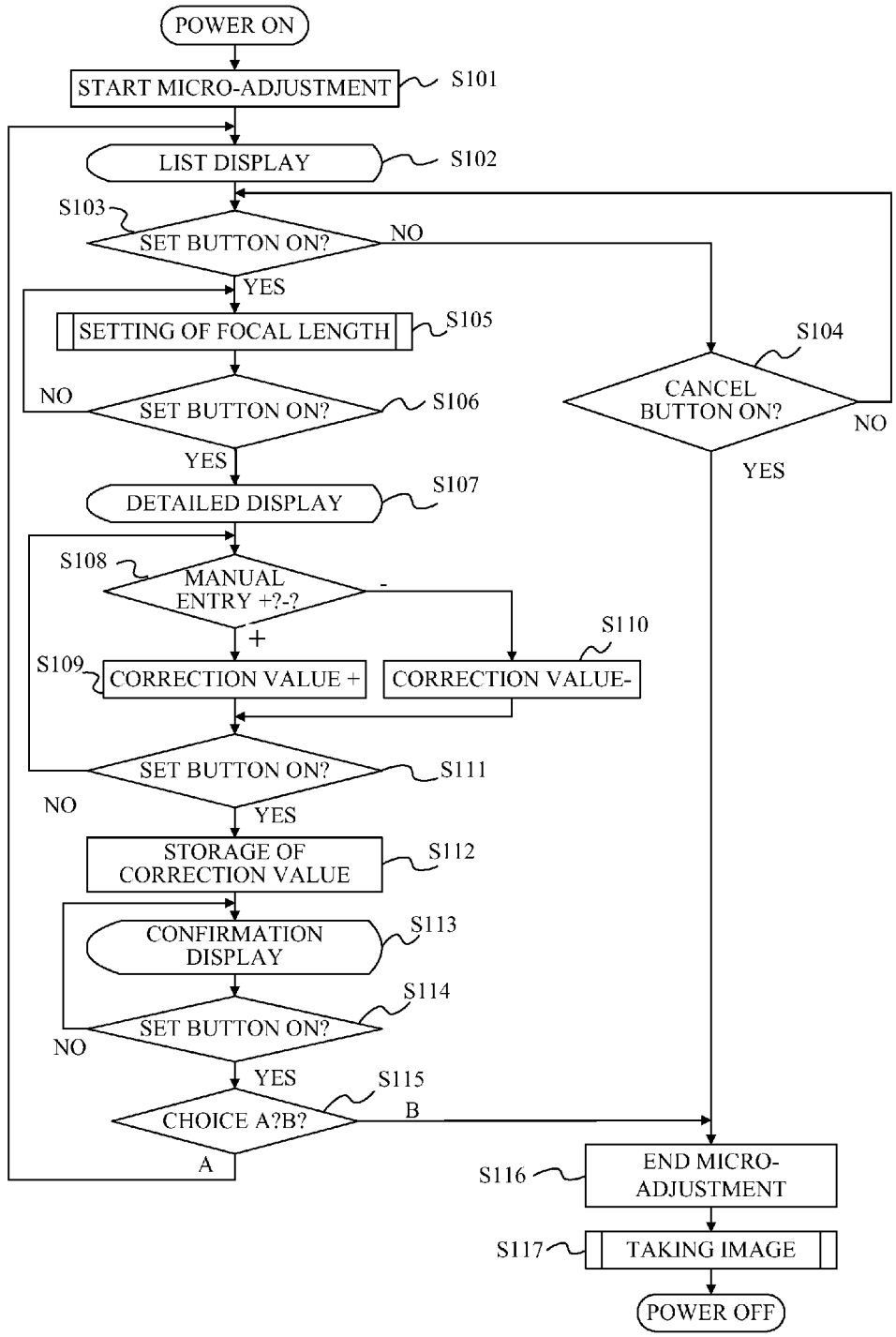
FIG. 3 is a diagram that illustrates a main flow in a first embodiment.

Hereafter, a function to manually correct the phase difference AF (hereinafter, micro-adjustment) will be described with reference to FIG. 3 and FIGS. 4A-4D. FIG. 3 illustrates a main flow in the first embodiment.

The micro-adjustment is started in S101.

The list of correction values is displayed in S102. The screen at this time is displayed as FIG. 4A.

Figure 4A:
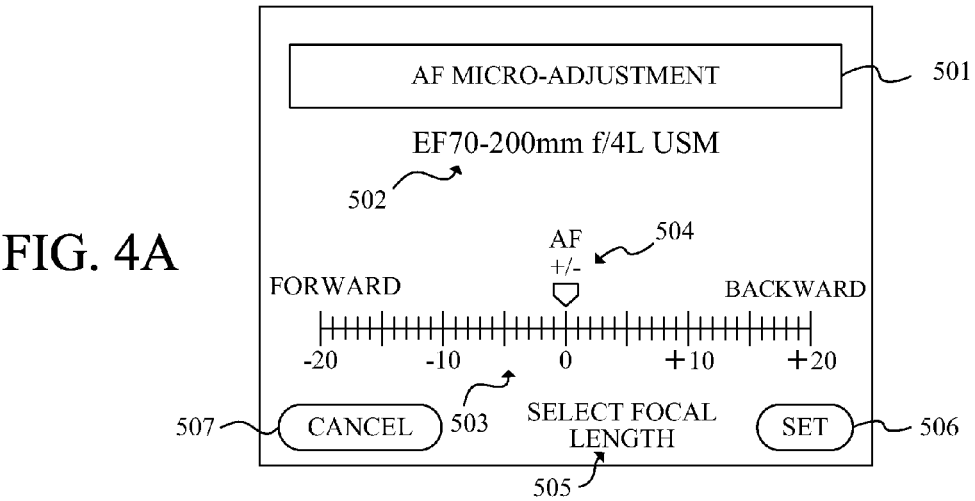
FIG. 4A is a diagram that illustrates a list display screen of correction values in a state there is no correction value.

In FIG. 4A, reference numeral 501 indicates the present mode.

Reference numeral 502 is a lens information display for displaying a name of a lens or an extender that is currently attached. When anything is not attached, the lens information display 502 displays a warning. In addition, the lens information display 502 indicates not only a display that displays the lens name but also a display that displays the present focal length described below, the present full-opened F number, the present focus position, a focal length where the correction value is set, or a focus position where the correction value is set.

Reference numeral 503 denotes a scale for indicating the correction value. This scale is "scale indication" in which the correction amount represented by one scale changes according to the full-opened F number of the lens.

Reference numeral 504 denotes an indicator for indicating the correction value. The correction value is represented depending on a position of the indicator for the scale. It is displayed at the position of ±0 in the initial state.

Reference numeral 505 indicates a display that indicates the effect of the SET button.

Reference numeral 506 denotes a SET button display.

Reference numeral 507 denotes a cancel button display.

In S103, it is determined whether the SET button is pressed. When the set button is pressed, it proceeds to the next step. On the other hand, when the set button is not pressed, it is determined whether the cancel button is pressed in S104. The flow when the cancel button is pressed will be described later. When the cancel button is not pressed, it returns to S103 and repeats S103 and S104.

In S105, the focal length is selected. A selecting method of the focal length will be described later.

In S106, it is determined whether the SET button is pressed. When the SET button is pressed, it proceeds to the next step. On the other hand, when the SET button is not pressed, S105 is repeated.

In S107, the correction value is displayed in detail. The screen at this time is displayed as FIG. 4B.

Figure 4B:
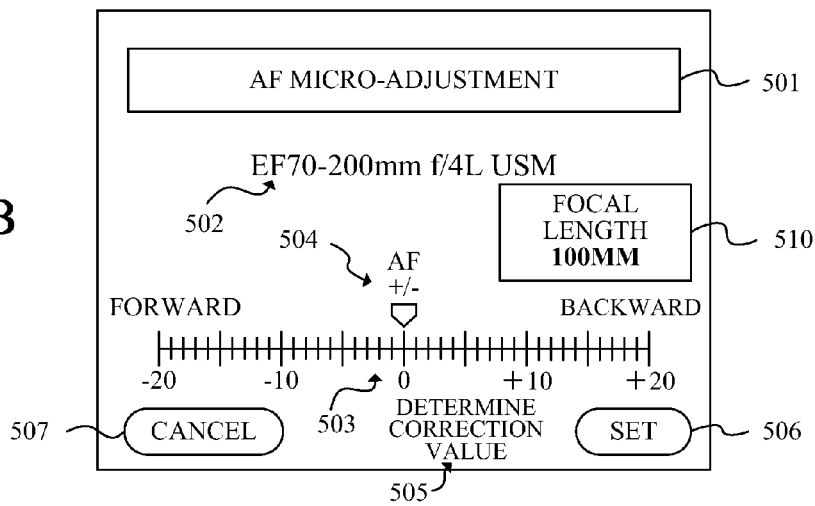
FIG. 4B is a diagram that illustrates a detailed display screen for setting the correction value.

In FIG. 4B, reference numeral 510 indicates a focal length to be corrected. The focal length selected in S105 is displayed here.

In S108, it is determined whether plus or minus is input as the correction value by a user with an input apparatus having a dial etc. (not shown).

In S109, the correction value becomes plus. On the screen at this time, the indicator 504 moves to a right (plus) side over the scale 503.

In S110, the correction value becomes minus. On the screen at this time, the indicator 504 moves to a left (minus) side over scale 503.

In S111, it is determined whether the SET button is pressed. It proceeds to the next step when the SET button is pressed. On the other hand, when the SET button is not pressed, S108 to S110 are repeated.

In S112, the correction value is stored in the camera memory 42.

In S113, a confirmation display of the correction value is performed. The screen at this time is displayed as FIG. 4C.

Figure 4C:
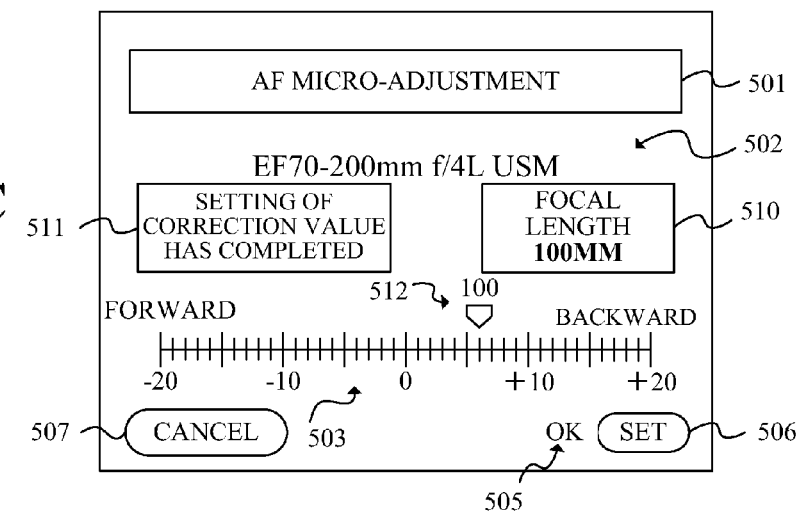
FIG. 4C is a diagram that illustrates a confirmation display screen for confirming the set correction value.

In FIG. 4C, reference numeral 511 indicates a message to convey that the setting of the correction value is completed. The user confirms this message and a set correction value 512.

In S114, it is confirmed whether the SET button is pressed. When the SET button is pressed, it proceeds to the next step. When the SET button is not pressed, the confirmation display in S113 is continued.

In S115, it is determined whether choice A or B described later is selected. In particular, it is determined whether to continue or to end the correction. The screen at this time is displayed as FIG. 4D.

Figure 4D:
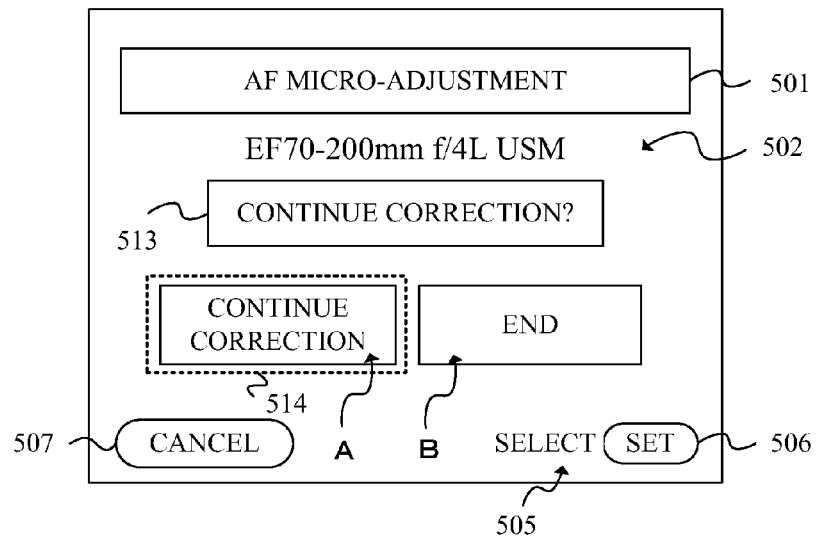
FIG. 4D is a diagram that illustrates a final confirmation screen to confirm whether to continuously correct or not.

In FIG. 4D, reference numeral 513 indicates a message from the camera to the user. It asks the user whether to continue the correction.

Reference numeral 514 indicates a frame for selecting choices, and this frame can be moved with an input device (not illustrated) such as a dial.

The choice A is for continuing the correction. When the SET button is pressed in the case that the choice A has been selected, it returns to the list display (S102) and the correction is continued.

The choice B is for ending the micro-adjustment. When the SET button is pressed in the case that the choice B has been selected, it proceeds to a micro-adjustment end step (S116) described later.

Flowing that, a flow when the hit of the cancel button is determined in S104 will be described. When the hit of the cancel button is determined in S104, it proceeds to S116.

In S116, the micro-adjustment is ended.

In S117, an image is taken using a correction obtained in the micro-adjustment. The flow of taking an image will be described later.

In this way, a sequence of flow of the micro-adjustment is terminated.

Figure 5:
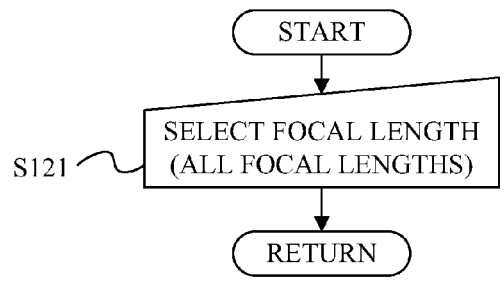
FIG. 5 is a diagram that illustrates a flow of a focal length selecting method in the first embodiment.

Hereinafter, the selecting method of the focal length in S105 will be described with reference to FIGS. 5 and 6. FIG. 5 illustrates a flow of the selecting method of the focal length.

In S121, a focal length to be corrected is selected from all focal lengths of the lens. The screen at this time is displayed as FIG. 6.

Figure 6:
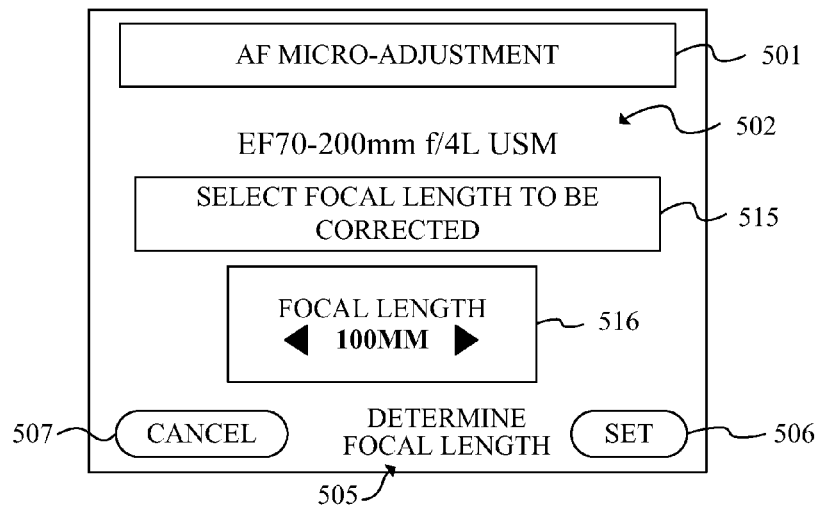
FIG. 6 is a diagram that illustrates a display screen in selecting a focal length in the first embodiment.

In FIG. 6, reference numeral 515 indicates an instruction from the camera.

Reference numeral 516 indicates a focal length to be corrected, and it proceeds to S106 after the focal length to be corrected is positioned with the input device such as a dial. At this time, if in the displayed focal length the correction value has already been set in the focal length 516 to be corrected, the character or color of the focal length to be corrected are changed to emphasize it so that the user knows the corrected focal length.

In this way, the select of the focal length is completed.

Figure 7:
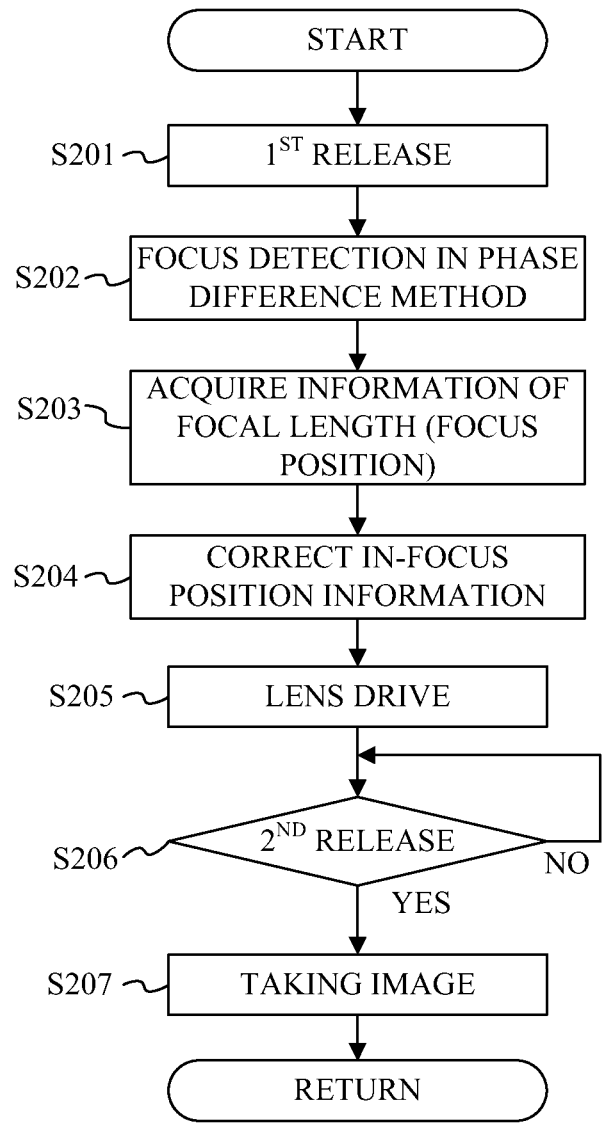
FIG. 7 is a diagram that illustrates a flow in taking an image.

Hereinafter, a method of taking an image in S117 by using the correction value obtained in the micro-adjustment will be described with reference to FIG. 7. FIG. 7 is a flow of taking an image.

In S201, a release button is put into a halfway press operation (1st release).

In S202, the focus detection is performed by the phase difference method with the AF sensor 22.

In S203, lens information, such as a focal length or focus position of the lens, is detected by the lens state detector 12.

In S204, on the basis of the focus detection result of the AF sensor 22, a specific correction value in each image-pickup lens, and the correction information according to the focal length, which is made by the above mentioned micro-adjustment, are taken from the camera memory 42, and in-focus position information is corrected by using them.

In S205, the lens is driven by the lens driver 11 on the basis of the corrected in-focus position information, and the in-focus operation is completed.

In S206, the release button is put into a complete press (2nd release).

In S207, an image is taken.

In this way, the flow of taking an image ends.

Moreover, in the micro-adjustment, "batch reset" mode that changes to an initial unset state all correction values which are each set in the focal lengths of the lens is included.

The preferred embodiment of the present invention has been described above, and the present invention is not limited by these embodiments and can variously be transformed and be changed within the range of the summary.

Second Embodiment

As a second embodiment of the present invention, a lens interchangeable digital single lens reflex camera system that provides a correction function (hereinafter referred to as "calibration") of a phase difference AF with half automatic or full automatic using a contrast detection method will be described. FIGS. 1 and 2 are the outline cross-sectional view in the present embodiment. In addition, the basic configuration is similar to that of the first embodiment, and the following explains different parts compared to the first embodiment.

The digital controller 41 includes a calculator that calculates a correction value based on difference between an output in the contrast detection method and an output from the AF sensor 22. The difference amount calculated by the calculator is stored in the camera memory 42 as correction information.

The camera system in this embodiment is configured to set a calibration mode to calculate and store the above mentioned correction information.

Figure 8:
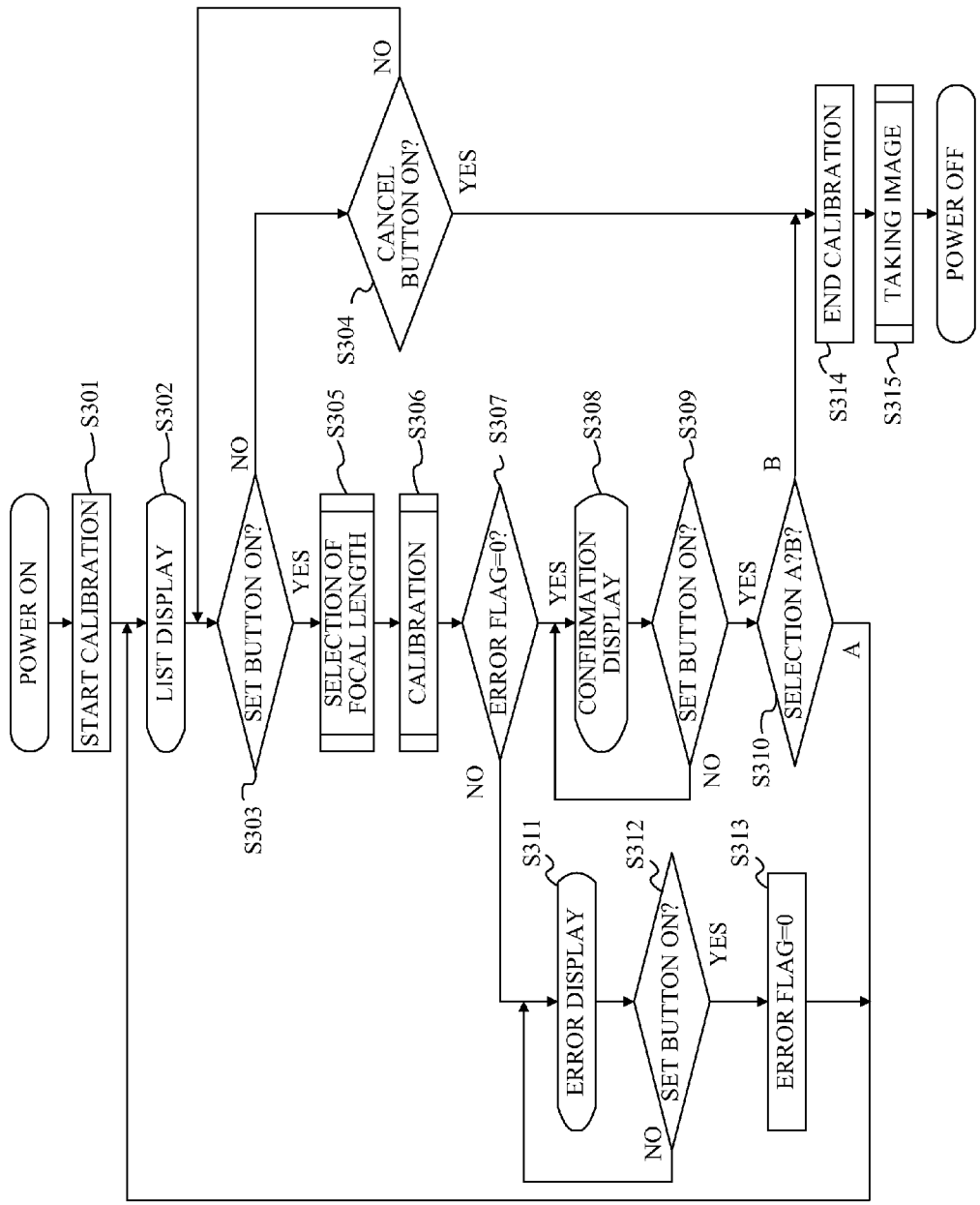
FIG. 8 is a diagram that illustrates a main flow in a second embodiment.
Figure 9A:
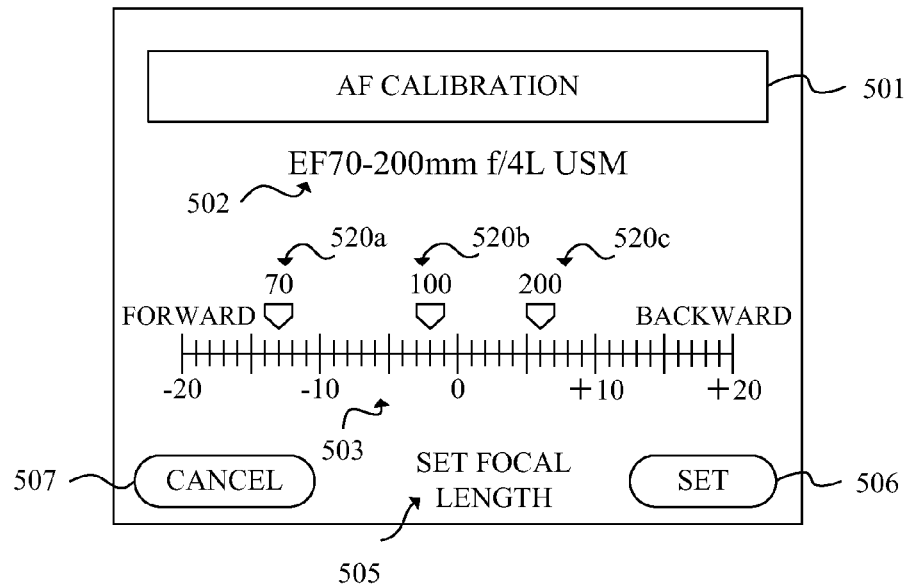
FIG. 9A is a diagram that illustrates a list display screen of correction values corresponding to a focal length in a state the correction value is set.
Figure 9B:
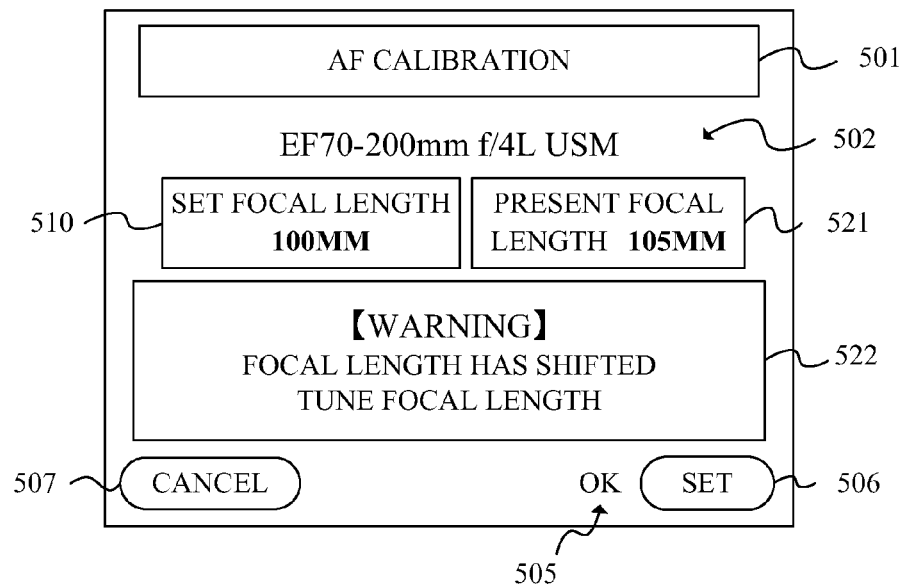
FIG. 9B is a diagram that illustrates a warning display screen in an error processing flow.

The followings describe the calibration with reference to FIGS. 8 and 9A-9B. FIG. 8 is a main flow in the second embodiment.

In S301, the calibration is started.

In S302, a correction value list is displayed. When the correction value has not been set yet, the screen is displayed as illustrated in FIG. 4A, but when the correction value has already been set by some focal lengths, the screen is displayed as illustrated in FIG. 9A.

In FIG. 9A, reference numeral 520a denotes an indicator that indicates the correction value of 70 mm focal length.

Reference numeral 520b denotes an indicator that indicates the correction value of 100 mm focal length.

Reference numeral 520c denotes an indicator that indicates the correction value of 200 mm focal length.

In S303, it is determined whether the SET button was hit. When the SET button was hit, it proceeds to the next step. In S304, when the SET button has not been hit, it is determined whether the cancel button was hit. A flow when the cancel button was hit will be described later. When the cancel button has not been hit, it returns to S303, and repeats S303 and S304.

In S305, the focal length is selected. The method of selecting the focal length will be described later.

In S306, the calibration is executed. A flow of the calibration will be described later.

In S307, it is determined whether an error flag is 0. The error flag turns to 1 when an error occurs in the after-mentioned flow of the calibration. If the error flag is 1, it proceeds to a step (S311) of an error processing described later. When the error flag is maintained as 0, it proceeds to the next step.

In S308, a confirmation display of the correction value obtained by the calibration is performed. The screen at this time is displayed as FIG. 4C.

In S309, it is confirmed whether the SET button was hit. When the SET button was hit, it proceeds to the next step. When the SET button has not been hit, it continues the confirmation display in S308.

In S310, it is determined whether a choice A or B was selected. The choice A is for continuing the correction, and the choice B is for ending the calibration. The screen at this time is illustrates as FIG. 4D as well as the first embodiment. When the choice A is selected and the SET button is hit, it returns to the list display (S302), and when the choice B is selected and the SET button is hit, it proceeds to a calibration end flow (S314) described later.

Next, an error processing flow when the error flag is 1 in S307 will be described. In this case the error indicates that the focal length shifted.

In S311, the error display is performed. The screen at this time is displayed as FIG. 9B.

In FIG. 9B, the reference numeral 510 indicates a focal length which the user selected in the focal length selection to perform the correction.

Reference numeral 521 indicates the present focal length. The present focal length 521 indicates information obtained from the lens state detector 12 in real time.

At this time, since error occurred by the shift of the focal length, the focal length 510 for performing the correction is different from the present focal length 521.

Reference numeral 522 indicates a warning to the user. In this case, the shift of the focal length is warned, and it is indicated to tune the focal length.

In S312, it is determined whether the SET button was hit. When the SET button was hit, it proceeds to the next step. While the SET button has not been hit, the error display in S311 is continued.

In S313, the error flag is returned to 0. In this step, the error is released, and the calibration becomes possible again by returning to the list display (S302).

Next, a flow when the hit of the cancellation button is determined in S304 is described. When the hit of the cancel button is determined in S304, it proceeds to S314.

In S314, the calibration is ended.

In S315, an image is taken by using the correction value acquired by the calibration. The flow in taking an image is similar to that in FIG. 7.

In this way, the sequence of the flow of the calibration ends.

Figure 10:
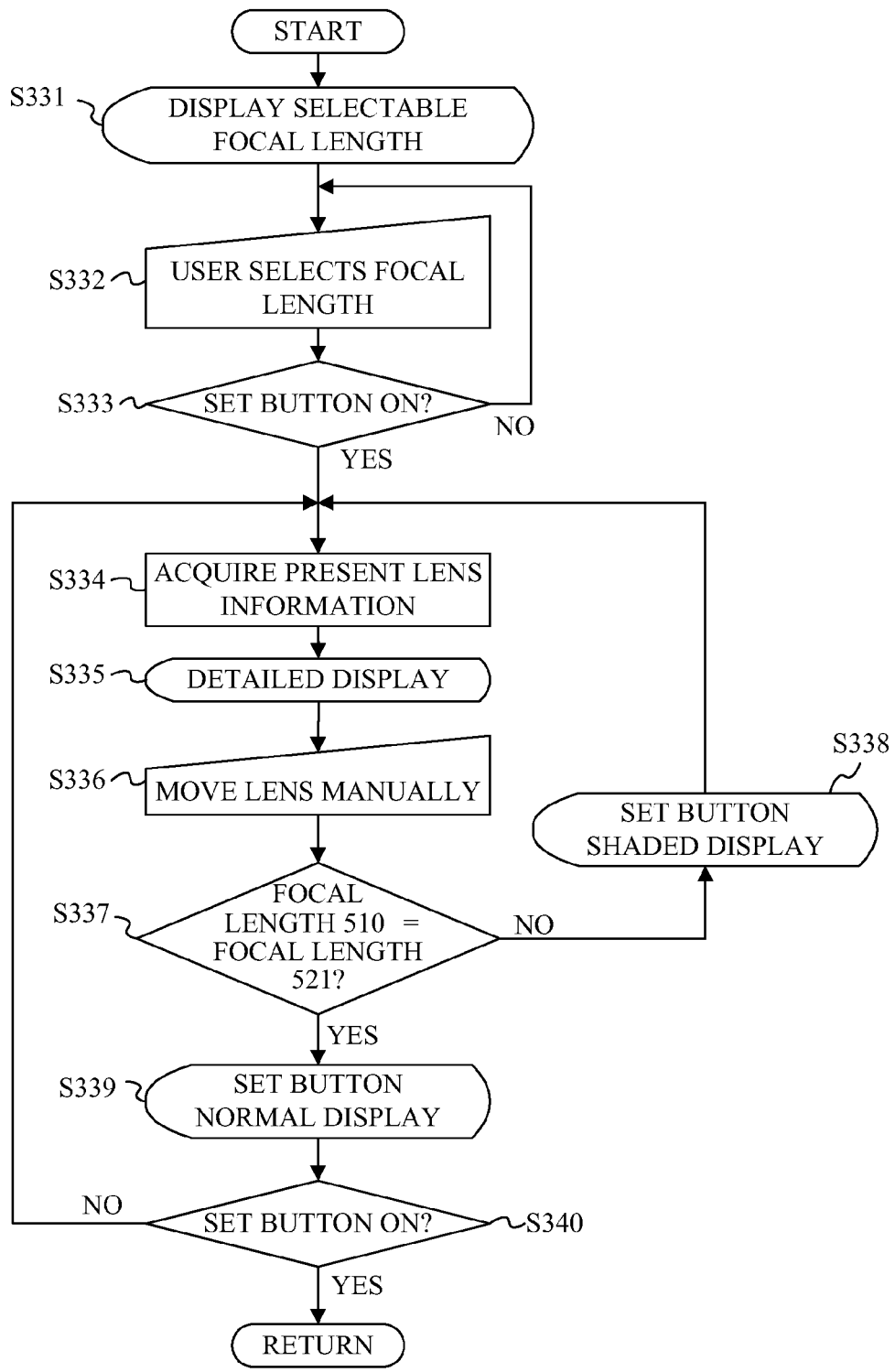
FIG. 10 is a diagram that illustrates a flow of a focal length selecting method in the second embodiment.

Hereinafter, the method of selecting the focal length in S305 will be described with reference to FIGS. 10 and 11A-11B. FIG. 10 is a flow of the method of selecting the focal length.

In S331, a plurality of selectable focal lengths is displayed on the screen. At this time, the screen is displayed as illustrated in FIG. 11A.

Figure 11A:
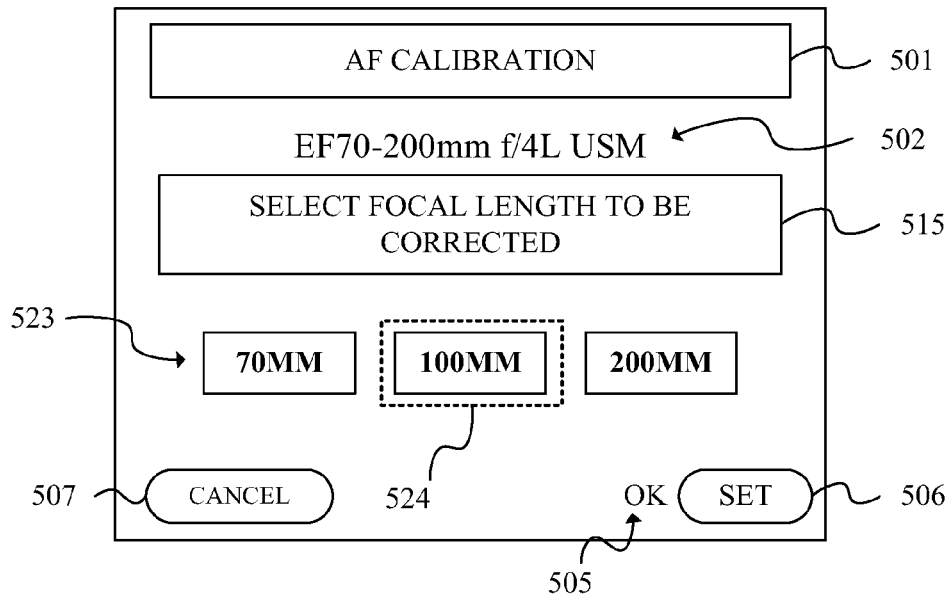
FIG. 11A is a diagram that illustrates a display for selecting a focal length to be corrected from among a plurality of focal lengths.
Figure 11B:
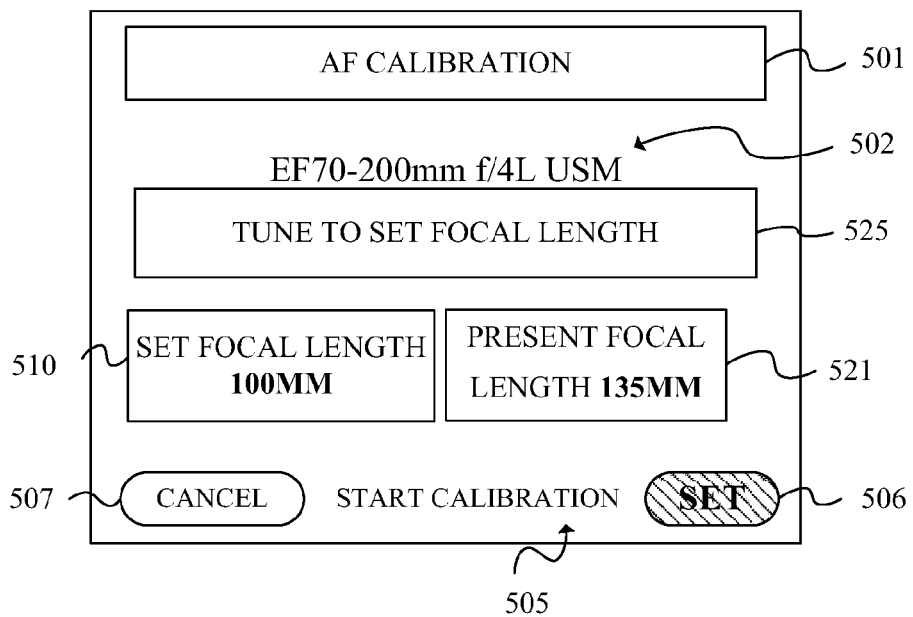
FIG. 11B is a diagram that illustrates a display to adjust the present focal length and conform it to the set focal length.

In FIG. 11A, reference numeral 523 indicates selectable focal lengths. These focal lengths are suggested by retrieving focal lengths capable of effectively performing the correction from the camera memory 42 depending on optical characteristic etc. of the lens. In FIG. 11A, three focal lengths of 70 mm, 100 mm and 200 mm are displayed as an example, but these may be displayed as wide end, middle end and telephoto end, and be made different depending on the number of the displayed focal lengths or values of the focal lengths.

In S332, one focal length is selected from among the focal lengths 523 that the user can select.

Reference numeral 524 denotes a flame for selecting the focal length, and the selection is performed with an input device such as a dial.

In S333, it is determined whether the SET button was hit. When the SET button was hit, it proceeds to the next step. When the SET button has not been hit, S332 is repeated.

In S334, the present lens information is acquired by the lens state detector 12.

In S335, a detailed display is performed. At this time, the screen is displayed as FIG. 11B.

The reference numeral 510 indicates the focal length to be corrected which is selected in S332.

The reference numeral 521 indicates the present focal length.

Reference numeral 525 indicates an instruction from the camera. Here, it is indicated that the focal length 510 to be corrected is conformed to the present focal length 521.

If the focal length 510 to be corrected and the present focal length 521 do not conform at this time, the SET button display 506 is displayed to indicate that the input of the button is unacceptable.

In S336, the user manually moves the lens to conform the present focal length 521 to the focal length 510 to be corrected.

In S337, it is determined whether the focal length 510 and the present focal length 521 conform.

In the case that they do not conform, it proceeds to S338, a display to indicate that the input of the SET button is unacceptable (shaded display) is provided, and returns to S334. After it returns to S334, S334 to S338 are repeated until the focal lengths are conformed. By repeating the steps, lens information is sequentially updated and a real time display is available. Moreover, the acquired lens information includes a full open F and a focus position etc., and these can also be displayed in real time.

In the case that they conform, it proceeds to S339, a display to indicate that the input of the SET button is acceptable (normal display) is provided, and it proceeds to the next step.

In S340, it is determined whether the SET button was hit. When the SET button was hit, it proceeds to S306 of the main flow. When the SET button has not been hit, it returns to S334.

Even if it is determined once in S337 that they conforms, when the focal length is shifted for some reasons before the hit of the SET button is determined in S340, it again returns to the display to indicate that the input of the SET button (shaded display) is inacceptable.

In this way, the selection of the focal length is completed.

Figure 12:
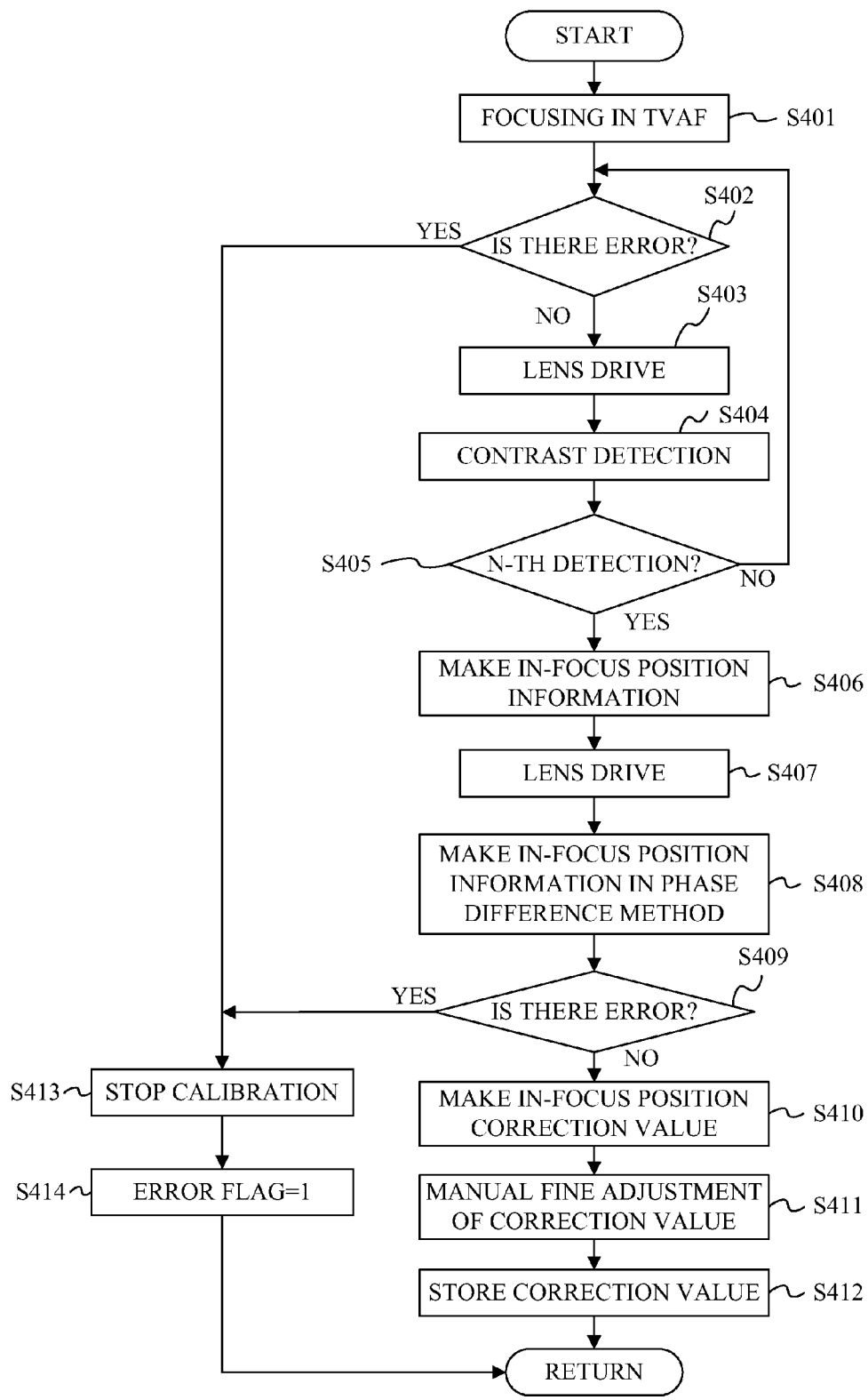
FIG. 12 is a diagram that illustrates a calibration flow.

Hereinafter, the flow of the calibration in S306 will be described with reference to FIG. 12.

An operation to determine an object is needed before the flow is started. After the object is determined, the calibration is started.

In S401, the object is focused on with the contrast detection method.

In S402, the focal length of the lens is confirmed by the lens state detector 12. When the focal length is out of alignment, it proceeds to an error processing to be described. When the focal length is not out of alignment, it proceeds to the next step.

In S403, the mechanism controller 40 sends a signal to the lens controller 13, and moves the focus lens to the predetermined position by the lens driving unit 11.

In S404, the contrast of the image signal obtained from the image pickup element 24 is detected in the digital controller 41.

In S405, the check of the focal length shifts in S402, a minute movement of the focus lens in S403, and the contrast detection in S404 are repeated until it reaches the predetermined number of times N.

In S406, the digital controller 41 determines as the in-focus position a focus position in which the image signal having the highest contrast in the "N" contrast detection results was obtained, and sends a signal to the mechanism controller 40. The mechanism controller 40 obtains the position information from the lens state detector 12 at that time through the lens controller 13, and makes in-focus position information.

In S407, the focus lens is moved by the lens driving unit 11 to the focus position having the highest contrast, which is obtained in S406.

In S408, the mechanism controller 40 let the AF sensor 22 perform the focus detection by the phase difference AF. Moreover, the in-focus position information is made by adding the detection result at that time, that is to say, a value that a focus shift amount (defocus amount) is converted into a driving amount in an in-focus direction of the focus lens, to the focus position information from the lens state detector 12.

In S409, the focal length of the lens is confirmed by the lens state detector 12. When the focal length is out of alignment, it proceeds to error processing.

In S410, the mechanism controller 40 let the digital controller 41 calculate an in-focus position correction value that is difference between the in-focus position information when the in-focus is determined by the digital controller 41 and the in-focus position information obtained from the detection result with the AF sensor 22.

In S411, the user fine adjusts the correction value according to his preference manually. A detailed flow at this time becomes like S107 to S111 in FIG. 3 of the first embodiment. The screen is similarly illustrated as FIG. 4B, and it proceeds to the next step when it is determined that the SET button was hit as represented in S111. Moreover, this S411 is removed in the case that the calibration is completely automated.

In S412, the digital controller 41 stores the in-focus position correction value in the camera memory 42.

Next, the error processing flow when an error is determined in S402 or S409 will be described.

In S413, the operation of the calibration is discontinued.

In S414, the error flag is set to one. As a result, it proceeds to the error processing flow of the main flow after this.

The calibration ends above. When the calibration ends, it proceeds to S307 of the main flow.

The preferred embodiment of the present invention has been described above, and the present invention is not limited by these embodiments and can variously be transformed and be changed within the range of the summary.

Third Embodiment

A lens interchangeable digital single lens reflex camera system that has a function capable of obtaining the correction value at each focus position will be described as a third embodiment of the present invention. Since the basic configuration is similar to that in the first embodiment, the following explains different parts compared to the first embodiment.

When it is determined in zoom lenses or single focus lenses that a lens needs the correction due to the effect of change etc. of the optical characteristic depending on the focus position, the camera system can display the correction value in each focus position. However, when the lens is determined as a signal focus lens that does not have to display a different correction value in the focus position, the correction value is displayed as only one.

Figure 13:
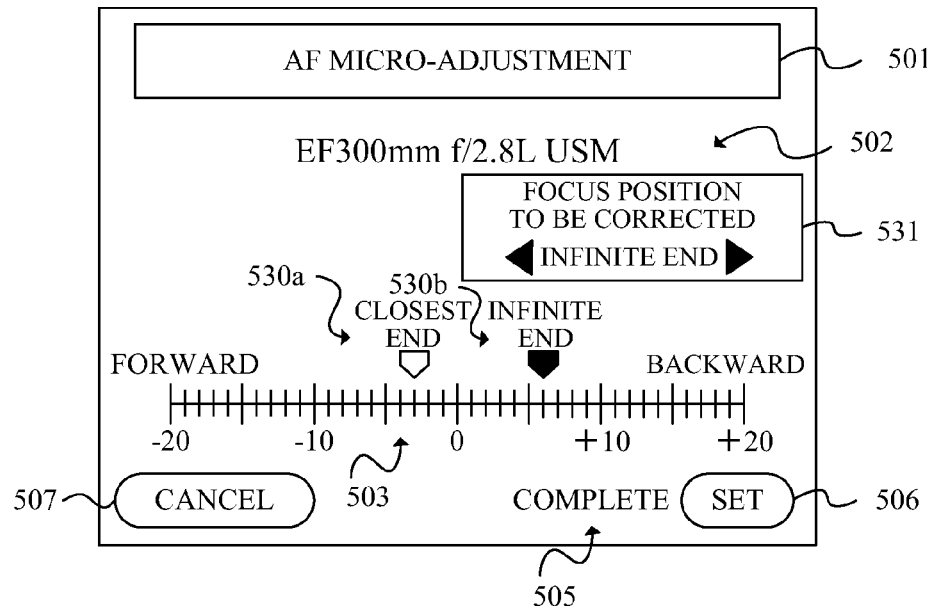
FIG. 13 is a diagram that illustrates a list display screen of correction values corresponding to the focus position in a state the correction value is set.

Hereinafter, the display method of the correction value in each focus position will be described with reference to FIG. 13. FIG. 13 is displayed in S107 of FIG. 3. The following explains a case that the correction value has already been set.

In FIG. 13, reference numeral 530a indicates a correction value at the closest end, and reference numeral 530b indicates a correction value at the infinite end.

Reference numeral 531 indicates a focus position to be corrected, and the focus position can be selected with an input devise (not illustrated) such as a dial.

When the present focus position conforms to the correction value 530a or 530b, the indicator is displayed by a color. As for FIG. 13, since the correction value 530b at the infinite end conforms to the present focus position, the correction value 530b at the infinite end is displayed by a color.

In this screen, when the correction value is set with the input devise (not illustrated) such as a dial and the SET button is hit, the correction is completed.

In this display method, each focus position is represented by easy expression such as the infinite end and the closest end, but it may be displayed in more detail, for example a display of distances to the object (object distance 1 m, 3 m . . . ). Moreover, each focus position is not limited to the infinite end or the closest end, and can be selected from among all focus positions.

The preferred embodiment of the present invention has been described above, and the present invention is not limited by these embodiments and can variously be transformed and be changed within the range of the summary.

Fourth Embodiment

A lens interchangeable digital single lens reflex camera system that has a function of changing the display in the detailed display and is capable of changing the scale for indicating the correction value between the scale display and the defocus display will be described as a fourth embodiment of the present invention. Since the basic configuration is similar to that in the first embodiment, the following explains different parts compared to the first embodiment.

The camera main body 2 includes a switch button A corresponding to a switching between the scale display and the defocus display, which is not illustrated in FIGS. 1 and 2.

Hereinafter, the method of switching the scale display and the defocus display will be described with reference to FIGS. 14A-14C.

The defocus display is an absolute value display that is displayed with a real defocus amount, an absolute amount that indicates a shift amount between the image-pickup element and the focus point is determined as a defocus amount, and one scale corresponds to 1 [μm].

Figure 14A:
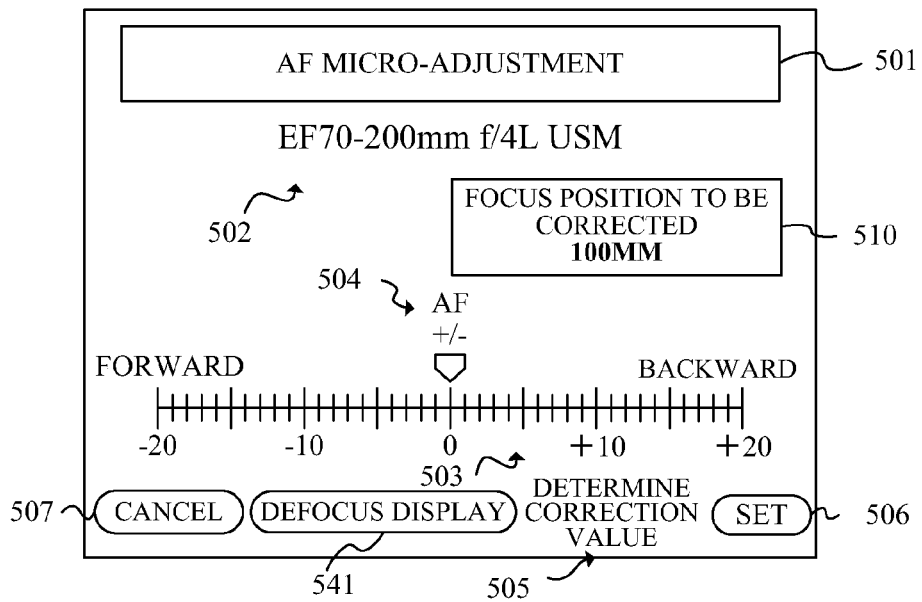
FIG. 14A is a diagram that illustrates a screen displaying a scale in a scale display.

At first, the scale 503 in FIG. 14A indicates a scale display in which one scale varies depending on a full open F number.

Reference numeral 541 indicates a button display for switching from the scale display to the defocus display. When a switch button A is hit in this display, the display is switched as FIG. 14B, and the scale 503 in the scale display is changed to the scale 540a in the defocus display and a unit ([μm]) 543 is added on the extreme right.

Reference numeral 544a denotes an arrow that represents the movement to the direction of the minus is possible, and reference numeral 544b denotes an arrow that represents the movement to the direction of the plus is possible.

Reference numeral 542 denotes a button display for switching from the defocus display to the scale display. It is displayed when the switching is performed by hitting the switch button A.

Figure 14B:
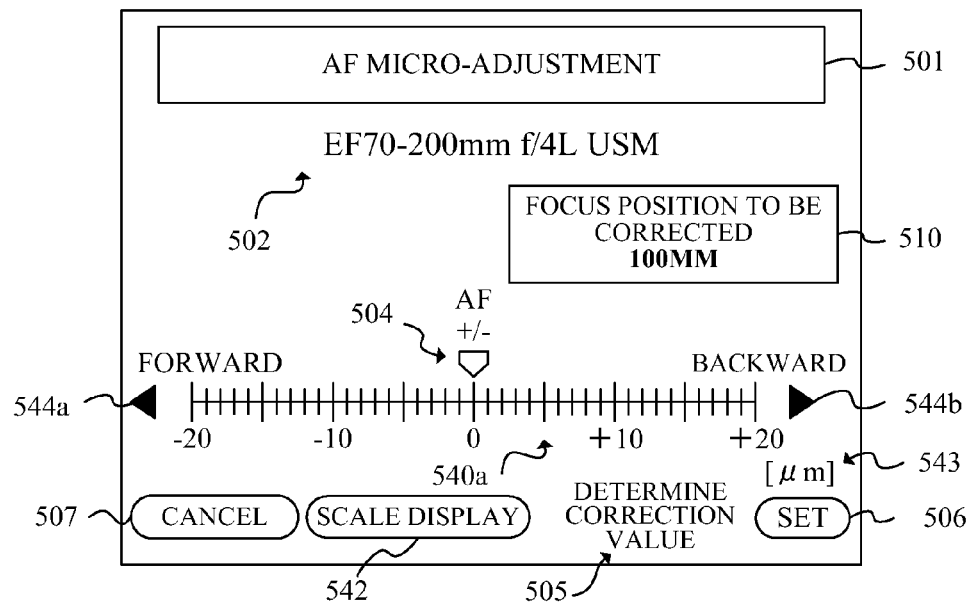
FIG. 14B is a diagram that illustrates a screen displaying a scale in a defocus display.
Figure 14C:
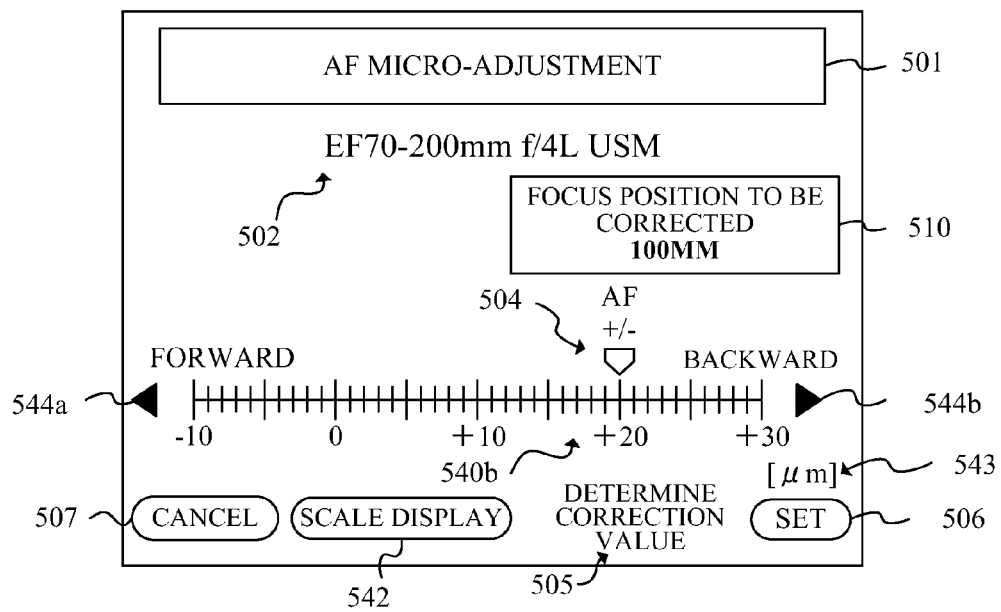
FIG. 14C is a diagram that illustrates a screen when the scale in the defocus display is shifted in a plus side.

When the indicator 504 of FIG. 14B is moved to the plus side by user's operation, the scale 540a shifts for display like the scale 540b of FIG. 14C in the entire scale, and it becomes possible to display a wide range of ±20 μm or more.

A method of switching a display in the detailed display has been described above, but also in the list display or the confirmation display, the switching between the scale display and the listed display is available as well as the detailed display.

The preferred embodiment of the present invention has been described above, and the present invention is not limited by these embodiments and can variously be transformed and be changed within the range of the summary.

Fifth Embodiment

A lens interchangeable digital single lens reflex camera system that has a plurality of display methods in the list display and further has a function capable of switching them will be described as a fifth embodiment of the present invention. Since the basic configuration is similar to that in the second embodiment, the following explains different parts compared to the second embodiment.

The camera main body 2 includes a switch button B for switching the display methods in the list display, which is not illustrated in FIGS. 1 and 2.

At first, a first list display method will be described with reference to FIGS. 15A and 15B.

Figure 15A:
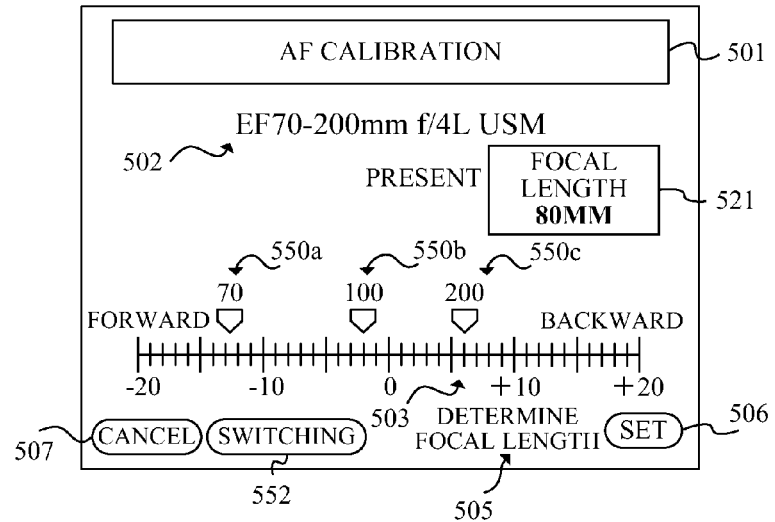
FIG. 15A is a diagram that illustrates a list display screen of a first correction value when a correction value corresponding to the present focal length is unset.
Figure 15B:
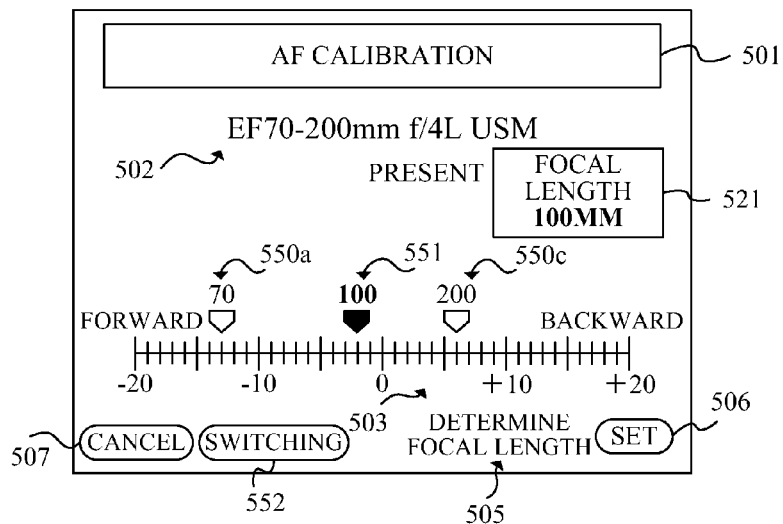
FIG. 15B is a diagram that illustrates a list display screen of the first correction value when the correction value corresponding to the present focal length is set and highlighted.

In FIGS. 15A and 15B, 70 that indicates a focal length 70 mm is displayed on an indicator 550a, 100 that indicates a focal length 100 mm is displayed on an indicator 550b, and 200 that indicates a focal length 200 mm is displayed on an indicator 550c. Each of these indicators indicates a correction value that has already been set.

In FIG. 15A, a normal list display is kept because the correction value of the focal length that is displayed in the present focal length 521 has not been set.

In FIG. 15B, since the correction value of the focal length that is displayed in the present focal length 521 has been set, the indicator 550b is emphasized by changing the color or the size of the arrow or the character as well as an indicator 551.

Next, a second list display method will be described with reference to FIGS. 15C and 15D.

Figure 15C:
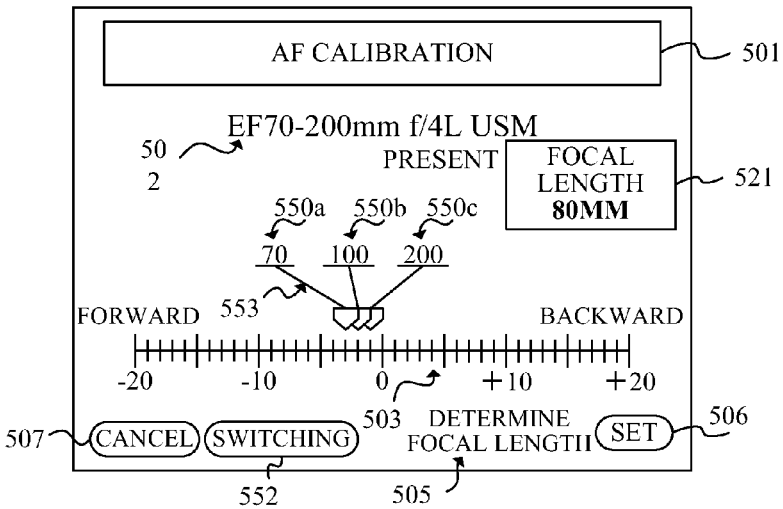
FIG. 15C is a diagram that illustrates a list display screen of a second correction value when the correction value corresponding to the present focal length is unset.
Figure 15D:
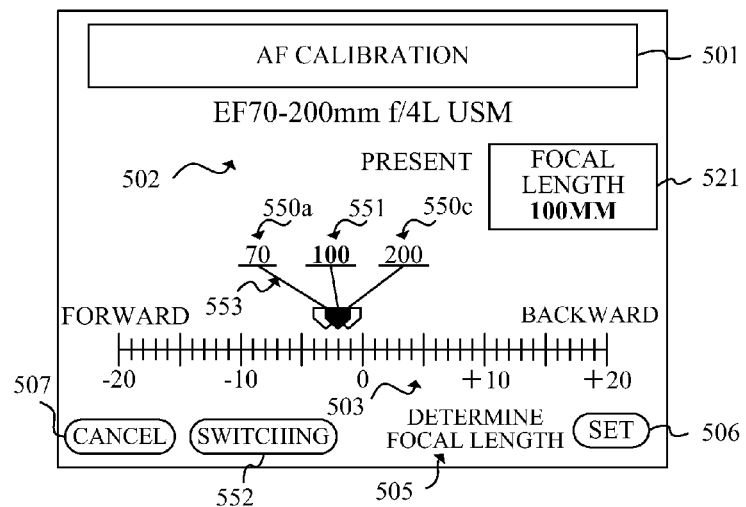
FIG. 15D is a diagram that illustrates a list display screen of the second correction value when the correction value corresponding to the present focal length is set and highlighted.

In FIG. 15C, if the display of the focal length is located just above the arrow when the correction values are closely-packed or overlapped, it is hard to see the display; therefore the focal lengths are displayed at little distant positions by using lead lines 553. When the present focal length 521 and the corrected focal length conform and these are displayed with an emphatic, the indicator 550b of FIG. 15C changes as well as the indicator 551 of FIG. 15D in terms of the color or the size of the arrow or the character.

Next, a third list display method will be described with reference to FIGS. 15E and 15F.

Figure 15E:
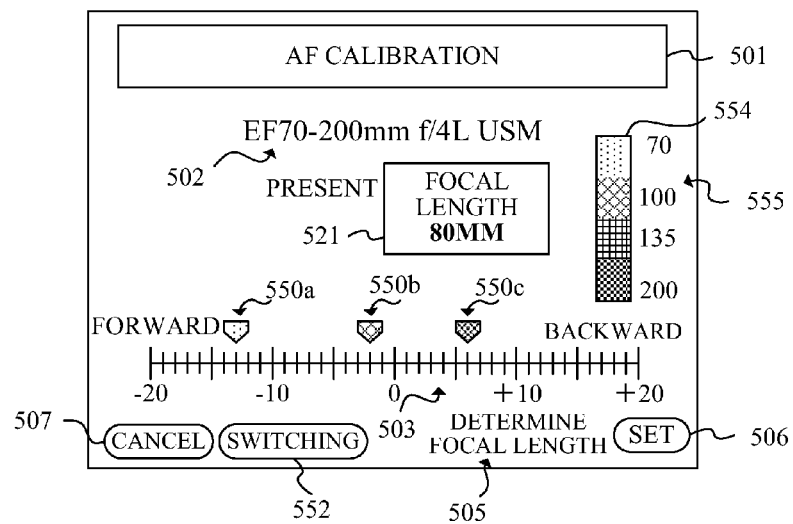
FIG. 15E is a diagram that illustrates a list display screen of a third correction value when the correction value corresponding to the present focal length is unset.
Figure 15F:
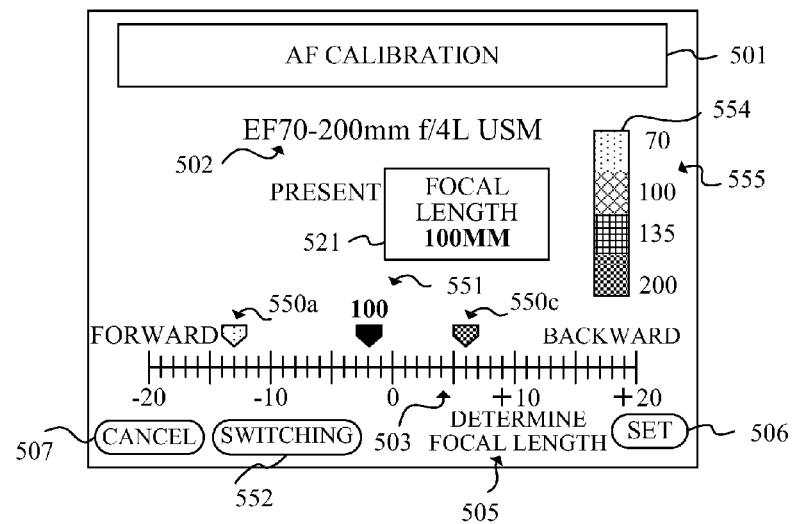
FIG. 15F is a diagram that illustrate a list display screen of the third correction value when the correction value corresponding to the present focal length is set and highlighted.

In FIG. 15E, the arrows indicating the correction value are displayed by adding colors to classify the focal lengths with color. On the screen, the correspondence table that represents the relationship between the colors and the focal lengths is displayed.

Reference numeral 554 denotes a color map, and reference numeral 555 indicates a focal length display corresponding to the color map 554. The focal length display 555 changes according to the attached lens. The indicators 550a, 550b and 550c are colored with a color corresponding to the focal length display 555 in the color map 554. Moreover, when the present focal length 521 and the corrected focal length (550b) conform and are displayed with an emphatic, the focal lengths are displayed above the arrows at the same time as the change of the color or the size of the arrows as well as the indicator 551 of FIG. 15F.

As for the switching to each display method, the display is changed in sequence by hitting the switch button B in a state that the switch button 552 is displayed.

The preferred embodiment of the present invention has been described above, and the present invention is not limited by these embodiments and can variously be transformed and be changed within the range of the summary.

Sixth Embodiment

A lens interchangeable digital single lens reflex camera system that has a calibration function capable of selecting the focal length where the correction is performed by directly moving the lens will be described as a sixth embodiment of the present invention. Since the basic configuration is similar to that in the second embodiment, the following explains different parts compared to the second embodiment.

Figure 16:
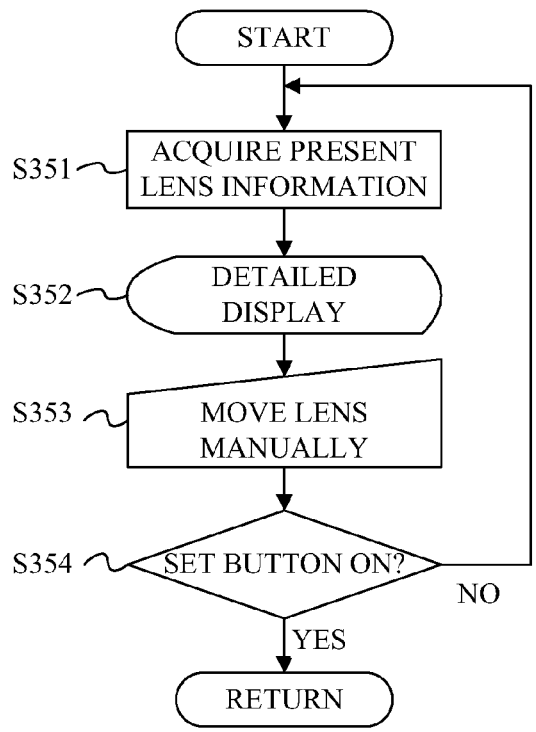
FIG. 16 is a diagram that illustrates a flow of a focal length selecting method in a sixth embodiment.

A display method in a selecting step (S305) of the focal length of FIG. 8 will be described with reference to FIGS. 16 and 17. FIG. 16 illustrates a flow of a focal length selecting method.

In S351, the present lens information is acquired.

In S352, the detailed display is performed. The screen at this time is displayed as FIG. 17.

Figure 17:
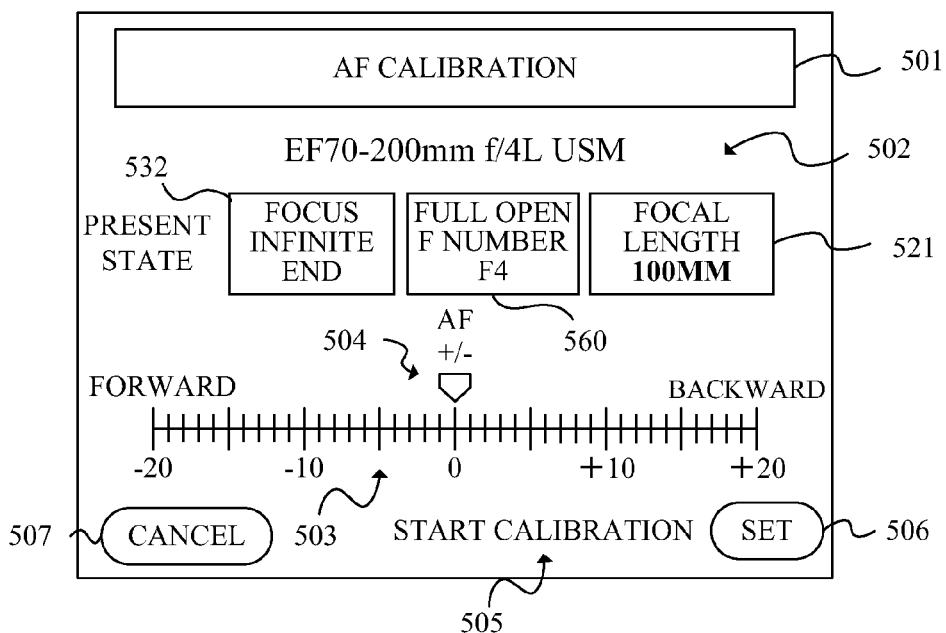
FIG. 17 is a diagram that illustrates a display screen in selecting a focal length in the sixth embodiment.

In FIG. 17, the reference numeral 521 indicates the present focal length, reference numeral 560 indicates the present full open F number, and reference numeral 532 indicates the present focus position.

In S353, the user manually moves the lens. When the lens is moved, the present focal length 521, the present full open F number 560, and the present focus position 532 are sequentially updated, and are displayed in real time. The user can proceed to the next step S354 when the focal length to be corrected is displayed in the present focal length 521.

At this time, when the present focal length 521 is a focal length that has already been corrected, it is displayed so that the user recognizes the corrected focal length by, for example, changing the color or the character to emphasize the display of the present focal length 521. Or, it is displayed so that the user recognizes the corrected focal length by, for example, displaying the indicator 504 at a position of the correction of the focal length.

In S354, it is determined whether the SET button was hit. When the SET button has not been hit, it returns to S351 and S351 to S354 are repeated. As a result, a real-time display of the lens information becomes possible. When the SET button was hit, it proceeds to S306 of FIG. 8.

In this way, the selection of the focal length is completed.

The preferred embodiment of the present invention has been described above, and the present invention is not limited by these embodiments and can variously be transformed and be changed within the range of the summary.

The following effects are achieved by the above-mentioned embodiments.

In the first embodiment, when the correction value of each focal length is set, it becomes comprehensible at what focal lengths the user corrects.

In the second embodiment, the set correction value becomes understandable at one view by the list display. Further, the load such as time that the user spends in the calibration can be reduced by suggesting the focal length that is effective in the correction. Furthermore, the setting of the calibration can become more comprehensible by the real-time display of the lens information.

In the third embodiment, the focusing accuracy of the image taking can be improved by displaying the correction value for a focus position.

In the fourth embodiment, an incomprehensible display of the correction value becomes easy to imagine the correction amount by displaying as an absolute value.

In the fifth embodiment, the extent of the corrected focal length or the correction amount etc. is known intuitively. Further, it can be prevented that the corrected focal length is again corrected by mistake.

In the sixth embodiment, the selection and the alignment of the focal length is available intuitively at the same time.

This application claims the benefit of Japanese Patent Application No. 2011-065102, filed on Mar. 24, 2011, which is hereby incorporated by reference herein in its entirety.

What is claimed is:

1. A control apparatus of an image-pickup apparatus, comprising:
    a display controller configured to control a display unit to display a scale that represents a correction value for correcting an in-focus position of a phase difference AF, and to control the display unit to display, in association with the scale, lens information including at least one of information relating to a focal length of a lens unit and information relating to a focus position, the display of the scale being controllable by a user to select the correction value; and
    a setting unit configured to set the correction value corresponding to the information which is displayed on the display unit.

2. The control apparatus according to claim 1, wherein the lens information includes at least one of a present focal length, a focal length that sets the correction value, a present full open F value, a present focus position, and a focus position that sets the correction value.

3. The control apparatus according to claim 1, wherein at least one of the focus length and the focus position to which the correction value is set is selectable from all focal lengths and all focus positions of the lens unit.

4. The control apparatus according to claim 1, wherein at least one of a present focal length and a present focus position that is displayed in real time is selectable as at least one of the focal length and the focus position to which the correction value is set.

5. The control apparatus according to claim 1, wherein a method of displaying the scale is changeable.

6. The control apparatus according to claim 5, wherein the scale is a scale display in which one scale changes depending on a full open F value.

7. The control apparatus according to claim 5, wherein the scale is an absolute display which is displayed by using a real defocus amount.

8. The control display apparatus according to claim 1, wherein a display method when the correction values are displayed by a list is changeable.

9. An optical apparatus comprising:
    an interchangeable lens unit; and
    an image pickup apparatus that includes the control apparatus according to claim 1.

10. The control apparatus according to claim 1, wherein the display controller configured to control the display unit to display an indicator that is used for setting the correction value related to the information displayed by the lens information display.

11. The control apparatus according to claim 10, wherein the indicator including a plurality of indicators is displayed for the scale so that a list of the correction values of at least one of the focal length and the focal position is displayed.

* * * * *